(12) United States Patent
Skutt

(10) Patent No.: US 7,612,466 B2
(45) Date of Patent: Nov. 3, 2009

(54) SYSTEM AND METHOD FOR COORDINATED CONTROL AND UTILIZATION OF LOCAL STORAGE AND GENERATION, WITH A POWER GRID

(75) Inventor: Glenn Richard Skutt, Blacksburg, VA (US)

(73) Assignee: VPT Energy Systems, Blacksburg, VA (US)

( * ) Notice: Subject to any disclaimer, the term of this patent is extended or adjusted under 35 U.S.C. 154(b) by 160 days.

(21) Appl. No.: 12/021,185

(22) Filed: Jan. 28, 2008

(65) Prior Publication Data

US 2009/0189456 A1    Jul. 30, 2009

(51) Int. Cl.
*H02J 1/10* (2006.01)
*H02J 3/00* (2006.01)
*H02J 3/14* (2006.01)
*H02M 1/10* (2006.01)

(52) U.S. Cl. .................................................. 307/29
(58) Field of Classification Search .................. 307/29, 307/43, 87, 9.1, 10.1
See application file for complete search history.

(56) References Cited

U.S. PATENT DOCUMENTS

| | | |
|---|---|---|
| 4,849,648 A | 7/1989 | Longardner |
| 5,845,479 A | 12/1998 | Walton |
| 5,934,096 A | 8/1999 | Munson et al. |
| 6,297,980 B1 | 10/2001 | Smedley et al. |
| 6,671,585 B2 | 12/2003 | Lof et al. |
| 7,000,395 B2 * | 2/2006 | Wai et al. ....................... 60/698 |
| 7,207,405 B2 | 4/2007 | Reid et al. |
| 7,233,082 B2 * | 6/2007 | Furuya et al. ................. 307/64 |
| 7,239,044 B1 | 7/2007 | Atcitty et al. |
| 2005/0006958 A1 | 1/2005 | Dubovsky |
| 2006/0250902 A1 | 11/2006 | Bender et al. |

* cited by examiner

*Primary Examiner*—Albert W Paladini
*Assistant Examiner*—Carlos Amaya
(74) *Attorney, Agent, or Firm*—MaxValueIP LLC

(57) ABSTRACT

Our system improves the efficiency and functionality of a grid-interactive or grid-tied power system that utilizes one or more local power sources and one or more local energy storage devices. The purpose is the coordination, optimization and efficient control, regulation, and transfer of electrical energy among several energy storage devices, power generators, the utility grid, and connected local electrical loads. The coordinated control and utilization of local storage and generation combined with coordinated integration with the utility grid results in an overall system that can be more flexible, economical, and efficient than any of the individual components can be, when operated separately. It uses dynamic adjustment, feedback, and other control modules/methods.

20 Claims, 5 Drawing Sheets

Detail of Controlled Switchgear

SYSTEM AND METHOD FOR COORDINATED CONTROL AND UTILIZATION OF LOCAL STORAGE AND GENERATION, WITH A POWER GRID

BACKGROUND

This invention improves the efficiency and functionality of a grid-tied power system that utilizes one or more local power sources and one or more local energy storage devices. The purpose of the invention is the coordination, optimization and efficient control, regulation, and transfer of electrical energy among several energy storage devices, power generators, the utility grid, and connected local electrical loads. The coordinated control and utilization of local storage and generation combined with coordinated integration with the utility grid results in an overall system that can be more flexible, economical, and efficient than any of the individual components can be, when operated separately.

In poly-phase power distribution systems, it is desirable to balance the loads on the individual phases of the system. Ideally, the loads on all the phases should be close to equal or balanced. For example, it would be unacceptable for the loads on one phase to greatly exceed the loads on the other phases of a poly-phase system. As used herein, the word "balanced" means that the loads on the individual phases are equal within acceptable limits for the power distribution system in use; however, it does not mean that the loads on each phase are exactly equal or that the loads on all phases are non-zero.

Traditionally, load-balancing is accomplished by the electrician wiring the system. To do this, the electrician must keep an accounting of the power requirements of all the loads on each phase and add loads to, or remove loads from, each phase as necessary to achieve the desired balance. This method is very tedious and time consuming, during the installation of the system. In addition, for larger number of loads, this is not practical for a person to account for, and becomes very inefficient, inaccurate, and slow.

U.S. Pat. No. 5,934,096 discloses a wiring system for commercial refrigeration which permits power to be balanced among three phases of electrical power, which is an example of a traditional way of load-balancing, in addition to a good explanation of other prior art.

Some of the prior art are listed here:
- U.S. Pat. No. 7,239,044: Enhanced distributed energy resource system (Sandia Corp.)
- US Patent application: 20060250902: Plug-in hybrid vehicle with fast energy storage (AFS Trinity Power Corporation)
- US Patent Appl.: 20050006958: Grid-connected power systems having back-up power sources and methods of providing back-up power in grid-connected power systems (Morningstar)
- U.S. Pat. No. 6,297,980: Unified constant-frequency integration control of three-phase power corrected rectifiers, active power filters, and grid-connected inverters (Univ. of California)
- U.S. Pat. No. 7,207,405, Hybrid power supply apparatus for battery replacement applications, which addresses mobile applications.
- U.S. Pat. No. 6,671,585, System, method and computer program product for enhancing commercial value of electrical power produced from a renewable energy power production facility, which is of a high concern now, due to importance of energy and high cost, plus the environmental concerns.
- U.S. Pat. No. 4,849,648, A system and method of selectively deployed and utilized compressed air energy storage satellite facilities within an electrical power grid network, for the alternative methods used in industry.
- U.S. Pat. No. 5,845,479, Method for providing emergency reserve power using storage techniques for electrical systems applications, for backup/emergency systems.

However, none of the prior art (above) teaches the features of the current invention, mentioned below.

SUMMARY

Specifically, this system provides a method to realize the advantages of various distributed generation and energy storage technologies as parts of a system where they would be inadequate or uneconomical as a stand-alone energy source. When used in a suitable poly-phase power system, the controller discussed in this invention dynamically assigns/balances loads between different phases. An example of this system includes a combination of solar and wind power generators, as local sources, multiple bidirectional plug-in hybrid electric vehicles (BPHEV) or battery electric vehicles (BEV) that are used as local energy storage/generation devices, local loads, a connection to the electric utility grid, and a central switch transfer unit that acts to configure the interconnection of sources, loads, storage elements and utility grid. Such a system can provide:

- charging of the connected vehicles, while parked
- local storage for energy, generated by the distributed power sources
- demand side management of grid loading, in response to the utility dispatch signals
- emergency back-up power, available from the locally connected energy storage devices
- ability to provide ancillary services to the grid, such as reactive power sourcing and regulation services
- ability to use connected vehicles for supplying real and/or reactive power to the utility grid, when connected. This is one of our unique features.

DETAILED DESCRIPTION OF THE PREFERRED EMBODIMENTS

This system builds on existing technologies for power conversion, energy storage, grid interconnection, and load switching. It adds control and interconnection flexibility that allows for dynamic system reconfiguration.

A power hub system, in one embodiment, comprises:
 a connection to the electric utility grid, with a controllable line disconnect device one or more DC/AC inverters or bidirectional DC/AC power converters that connect on the AC side of the converter to a local area electric power system or to a point of common connection with the grid, local loads, and energy storage units one or more DC power sources connected to the DC side of the inverter or bidirectional converter one or more DC/DC converters connected between the DC side of the inverter or bidirectional power converter and a local energy storage unit or units one or more removable energy storage devices connected to the local area electrical power system or AC point of common connection through a controllable line disconnect device local loads system power monitoring devices, such as line current and voltage sensors that are capable of monitoring and communicating to a central control unit a central control unit that configures the state of line disconnect devices; collects, records, and communicates system power flow information; responds to configuration and operation commands, generated locally or dispatched from the utility system operator.

Figure 1:
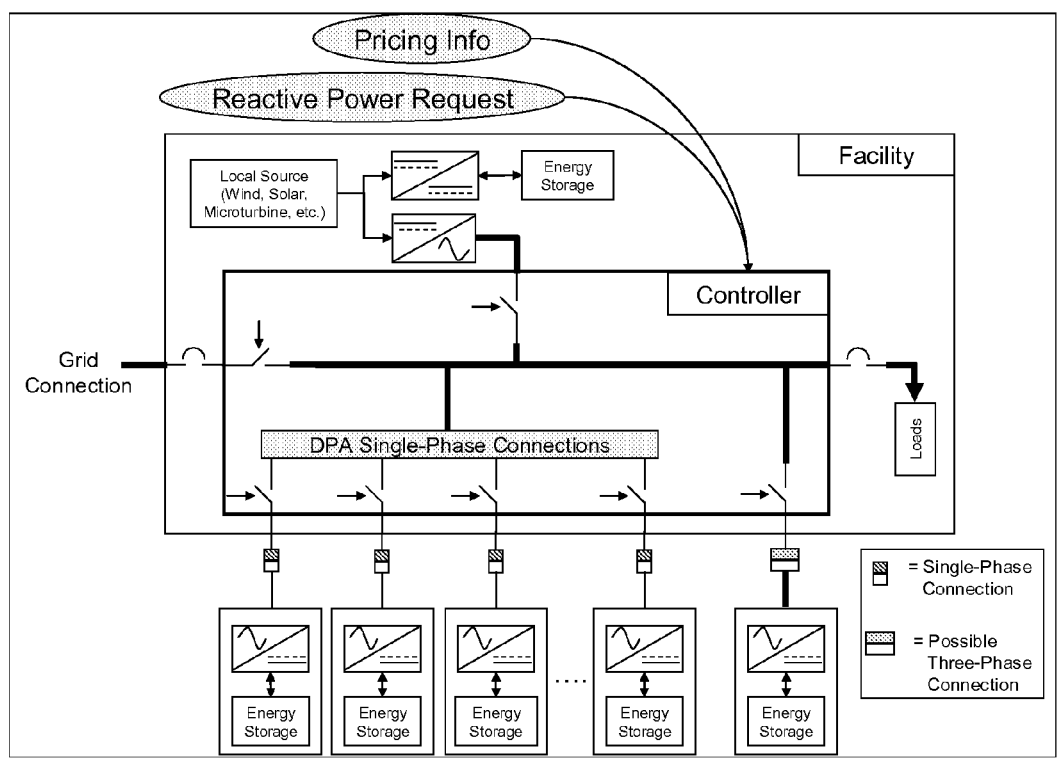
FIG. 1 describes an embodiment for the structure of the current invention. It describes one embodiment of the multi-sourced, controlled power distribution system. The energy storage units external to the facility represent removable devices, such as vehicles with energy storage capability.

A communications link to the power utility, provided through any of a variety of means, including but not limited to, interactive utility power meters FIG. 1 shows a block diagram of one embodiment of the power hub system. The system is designed to function correctly in several configurations that are highlighted in the figure. The DC local sources may connect to a local energy storage unit through a DC/DC converter, directly, or to the multiple removable energy storage modules (vehicles) through the DC/AC inverter and a rectifier/inverter in the vehicle, or other DC storage element. Alternate generation sources and energy storage devices are also possible, including micro-turbine sources, flywheel energy storage systems, etc. In all cases the power hub controller configures the appropriate power connections to meet the dynamic requirements and/or command objectives.

The following is given as an example:

The facility shown in FIG. 1 can be connected to the utility grid, either through a single-phase interface or through a three-phase interface. The removable energy storage units shown in the figure are connected to the facility AC power system either through a single-phase connection and/or through a three-phase connection. For a facility with a three-phase power utility connection, the removable loads that connect via a single-phase connection will be placed in parallel with the loads on a particular system phase.

FIG. 1 includes a dynamic phase assignment block that is capable of connecting energy storage units plugged into a single-phase connection to any of the three power phases. The controller monitors the overall system power flow and determines the optimal configuration on a dynamic basis, as removable energy storage unit connect and disconnect to the system. It also responds to pricing information and ancillary service requests communicated by the utility. The different sources of energy are connected to the system, e.g. wind, solar, and micro-turbine.

Figure 2:
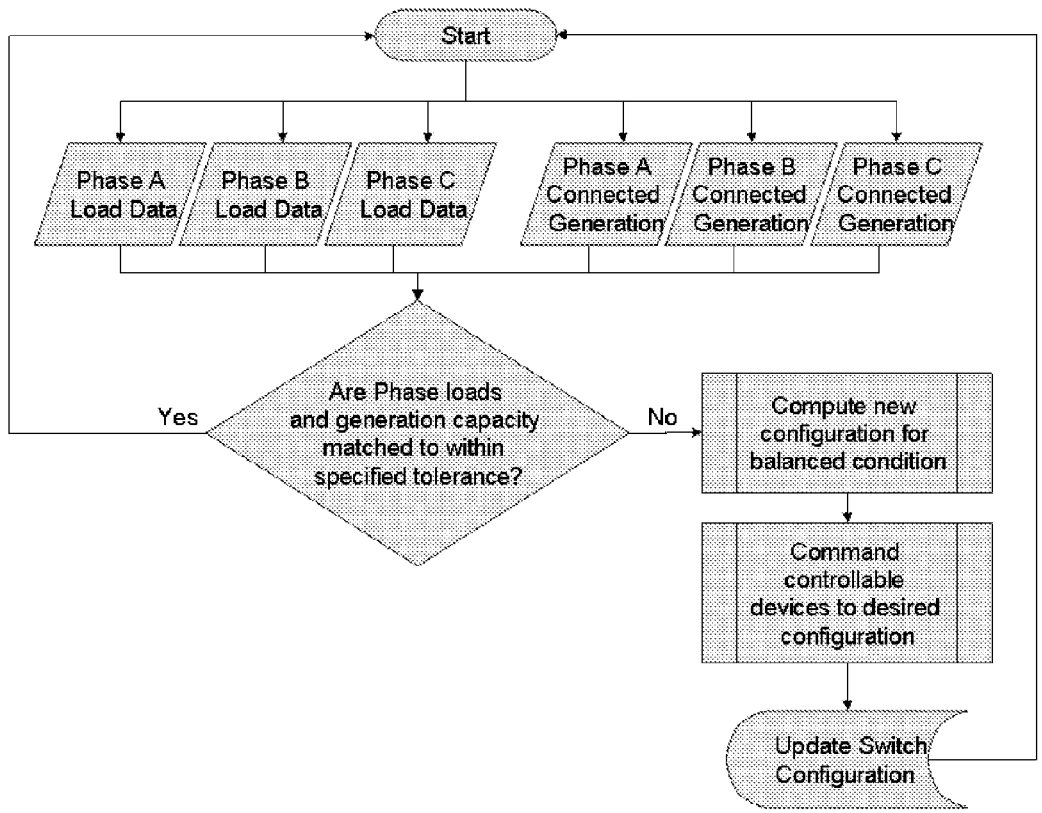
FIG. 2 describes an embodiment (flowchart) for the method of the current invention.

FIG. 2 shows the flow chart for balanced condition, with respect to load data and connected generation/phases. For each phase A, B, and C, we will have connected generator and load data. Then, it checks to see if it is within tolerance. If so, it starts again the process. Otherwise, it would compute a new configuration for matching load requirements with source capabilities and would set the command controllable devices to desired configurations. Then, after updating switch configuration, it will repeat the process again from the start.

Figure 3:
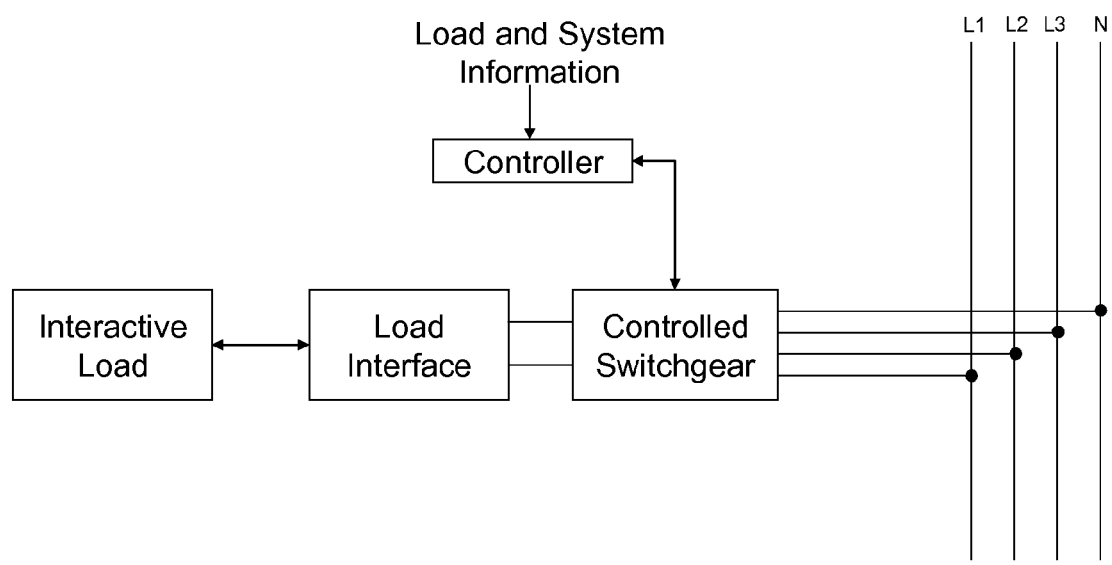
FIG. 3 describes an embodiment (controller) for our invention (system).

FIG. 3 shows the relationship between the load interface and the controller, as a part of the overall system. Load and system information are supplied to the controller, which feeds the controlled switch gear, which is connected to the load interface, plus interactive load module. The controlled switch gear is connected to the power lines: L1, L2, and L3, plus N.

Figure 4:
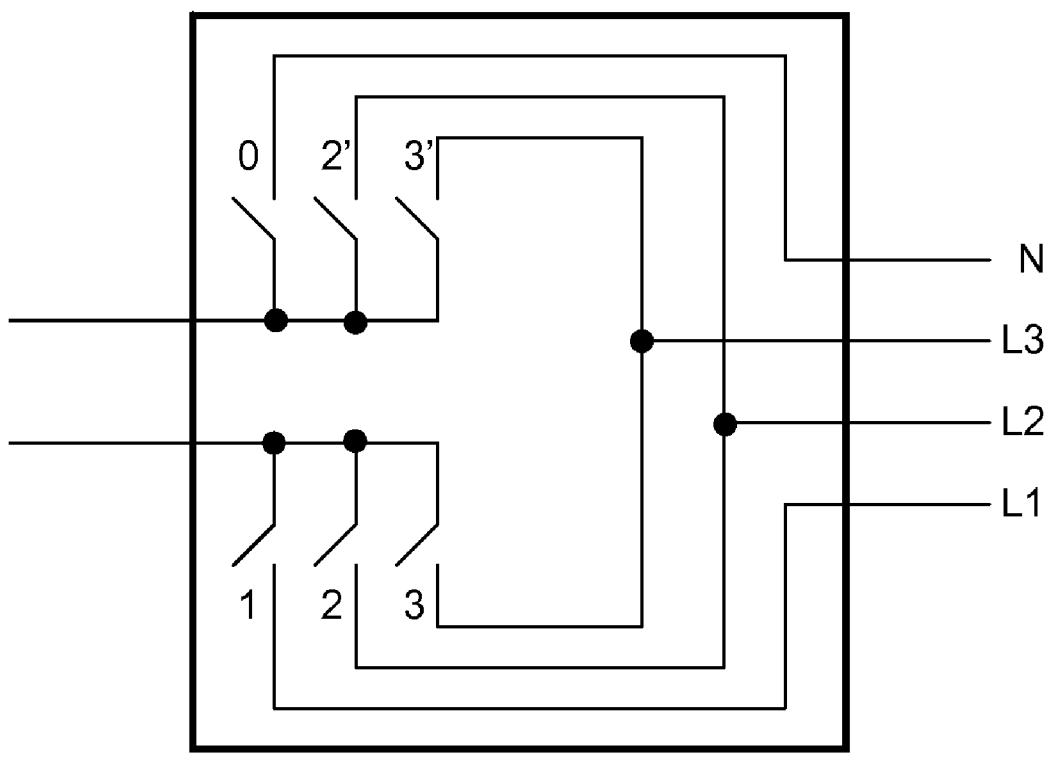
FIG. 4 describes the details of an embodiment of the controlled switchgear in FIG. 3.

FIG. 4 shows details of one implementation of the controllable switchgear of FIG. 3. The single-phase interactive load can be connected across any pair of the four-wire power lines shown: L1, L2, and L3, plus N (common line).

Figure 5:
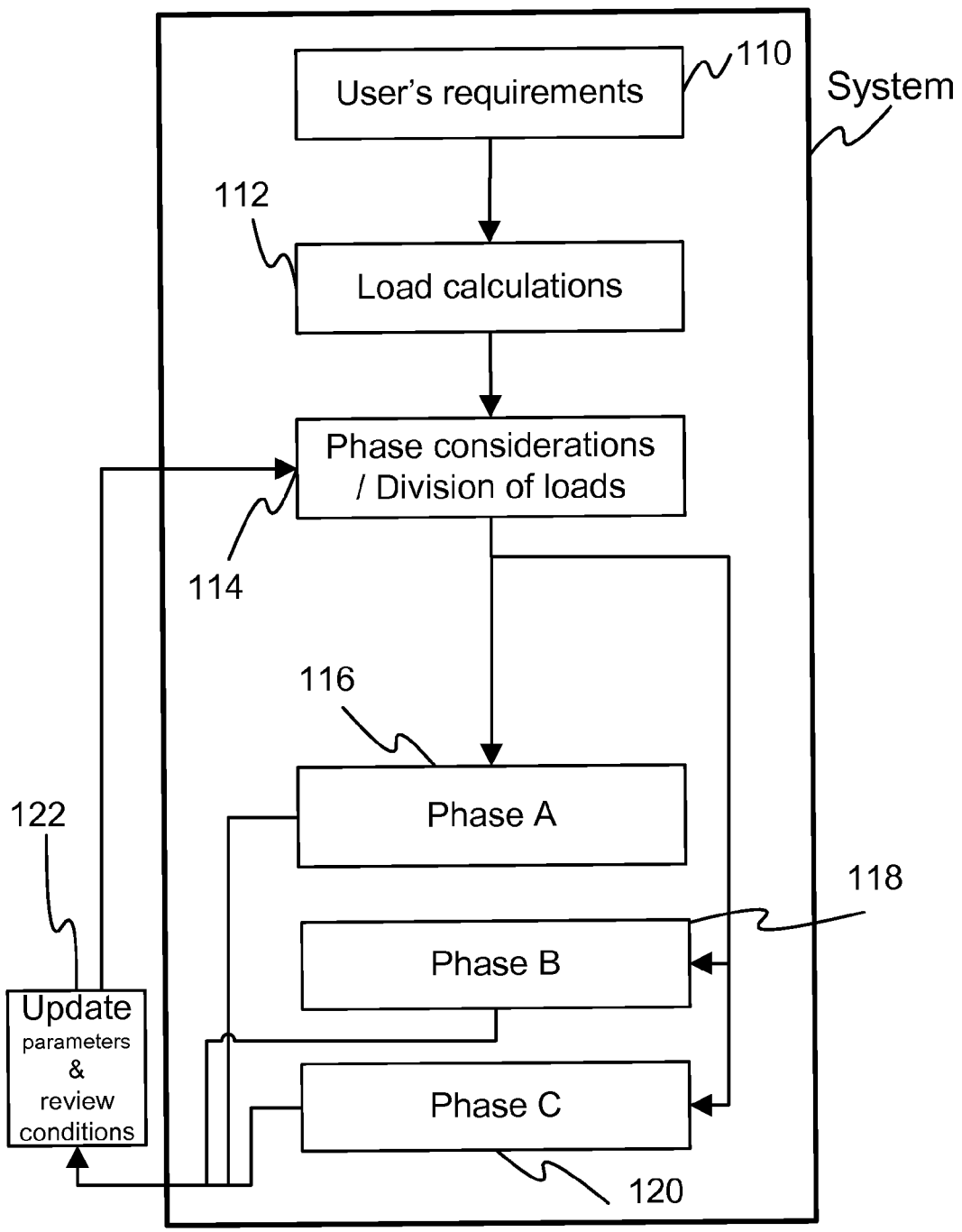
FIG. 5 is the dynamic adjustment of loads/phases, using a feedback loop, as one embodiment.

FIG. 5 shows the dynamic adjustment of loads/phases, using a feedback loop, as one embodiment of the system. First, the user's requirement is received (110). Then, the phase loads and/or sourcing requirements are calculated (112). Then, the phases are considered, and phase loading or reactive power sourcing calculated (114), with appropriate signals sent to phases A, B, and C (116, 118, and 120). The results are periodically updated (parameters), and the operating conditions are reviewed (122), to give feedback to load division module (114, again). This dynamic phase assignment process can adjust to changing system capacities or utility requirements, making the system very flexible and efficient. The parameters are optimized based on prior operation history, and can be fed back to the system. They can also be adjusted based on the change of environment, loads, requirements, constraints, time of day, season, or emergency conditions.

To optimize, the dynamic phase assignment (DPA) of multiple single-phase connected interactive loads (a generalization of the energy storage device) is performed based on a continuously updated evaluation of the relative loads placed on each phase of the three-phase power system (with DPA connecting multiple removable energy storage devices). The procedure proceeds as follows:

The central control unit maintains a frequently updated value of the magnitude and phase of the load placed on each separate phase circuit. In particular, the values (magnitude and phase) of IA, IB and IC are measured, communicated to the central control unit, and stored for use in subsequent calculations and data evaluation.

The current state of all connected interactive loads is updated by reading the state of a DPA multiplexer switch matrix that connects each interactive load to the three-phase power system.

The value of the current (magnitude and phase) for each connected interactive load is measured, communicated to the central control unit, and stored for use in subsequent calculations and data evaluation.

The central control unit control algorithm evaluates the current configuration of the connected interactive loads and compares the combined phase loads IA, IB, and IC to the current loading capacities and conditions (magnitude and phase) for the combined interactive loads connected to each of the phase circuits.

Based on the evaluation made in the previous step, the central control unit sends commands to the configurable DPA multiplexer switch matrix, as required, to match the capabilities and loading of the interactive loads with the current load conditions on each of the three phase circuits. System configuration changes can be implemented under control of standard phase synchronizing controllable contactors.

The process repeats at regular intervals, and is forced to occur between regular intervals, when certain conditions exist in the system, including but not limited to a change in the configuration of the interactive loads, such as a new interactive load being added, or/and existing interactive load being removed.

A neural network, with a teaching mechanism, fuzzy logic module, or other control method implementation can be added to control the distribution of the load, as much as possible, uniformly, between the phases. With fuzzy logic, each phase is assigned a parameter, with a membership function, valued between 0 and 1. Now, the assignment/distribution of loads is governed by the relative shape of these 3 membership functions. With neural network, the parameters are trained (and saturated/set as a steady state, on a matrix of nodes), so that after enough sampling and time, the next distribution of conditions are within the trained set/space, and it yields optimum/efficient load distribution.

In one example, the smaller the units and the more units we have, the distribution becomes less granular and less discrete (or more continuous), making the distribution more uniform, or optimized.

Or, in other words, if assuming, for that example:

$T_i$=load number i

T=total load

N=number of loads wherein:

i={1, 2, 3, . . . N}

Then, we will have, for the optimum situation, or better/more uniform distribution, in that embodiment:

$T_i$<<T or $(T_i/T)$<<1 and

N>>1

These conditions guarantee that the distribution of the loads is more uniform, statistically, making it easier to optimize. However, note that these conditions are not true for all of our embodiments. Thus, these are not necessary requirements at all, for our invention.

The system above can be used for any power generating means, such as hydraulic, nuclear, chemical, battery, AC, DC, mobile, stationary, rechargeable, one-time-use, wind, coal, waves, ocean, magnetic, particles, geothermal, or solar. It can be used for residential, commercial, consumer electronics, mobile devices, cars, and gadgets, such as cell phones, radio, cameras, and flash lights.

The systems above can be cascaded together, in series or parallel, and also can be hierarchical, in structure. The grid network can be star-shaped, or can be distributed, connecting point-to-point. The power can be high voltage, AC or DC. It can have conversion between different voltages, and also AC/DC conversion, as an example.

Any variations of the above teachings are also meant to be covered by the current patent application.

The invention claimed is:

1. A system for coordination, optimization, balancing, regulation, and transfer of electrical energy among plural energy storage devices, power generators, utility grid, and connected electrical loads, said system comprising:

one or more power generators;

one or more energy storage devices;

one or more interactive utility power devices;

wherein said one or more power generators, said one or more interactive utility power devices, and said one or more energy storage devices are connected together through a utility grid;

multiple electrical loads;

a controller;

a single-phase interface;

a three-phase interface; and a dynamic phase assignor;

wherein real and reactive power are supplied to said utility grid;

wherein said dynamic phase assignor connects or disconnects said one or more energy storage devices into said single-phase interface or into said three-phase interface; and wherein said controller monitors the overall system power flow, and determines the optimal configuration for said system, on a dynamic basis, by updating parameters and reviewing conditions and environment, on a regular basis, randomly, or based on a triggering event, using a feedback loop for load balancing and distribution.

2. A system as recited in claim 1, wherein said system comprises a DC to AC inverter.

3. A system as recited in claim 1, wherein said system comprises a bidirectional DC to AC power converter.

4. A system as recited in claim 1, wherein said system interfaces with a removable energy storage module.

5. A system as recited in claim 1, wherein said system interfaces with a hybrid electric vehicle.

6. A system as recited in claim 1, wherein said system interfaces with a backup power source.

7. A system as recited in claim 1, wherein said system interfaces with an interactive load.

8. A system as recited in claim 1, wherein said system interfaces with a hybrid power source.

9. A system as recited in claim 1, wherein said system interfaces with a fuzzy logic module.

10. A system as recited in claim 1, wherein said system interfaces with a neural network module.

11. A system as recited in claim 1, wherein said system interfaces with a central controller.

12. A system as recited in claim 1, wherein said system interfaces with a distributed controller.

13. A system as recited in claim 1, wherein said system interfaces with a mobile power supply.

14. A system as recited in claim 1, wherein said system interfaces with a mechanical power storage.

15. A system as recited in claim 1, wherein said system interfaces with a chemical power storage.

16. A system as recited in claim 1, wherein said system interfaces with a multiplexer switch.

17. A system as recited in claim 1, wherein said system interfaces with a solar photovoltaic power system.

18. A system as recited in claim 1, wherein said system interfaces with a wind turbine power source.

19. A system as recited in claim 1, wherein said system interfaces with distributed power sources.

20. A system as recited in claim 1, wherein said system interfaces with a power regulator.

* * * * *